June 2, 1964 J. S. PILCH 3,135,404
TRACTOR MOUNTED COUNTERWEIGHT
Filed June 27, 1962 3 Sheets-Sheet 1

INVENTOR.
JOHN S. PILCH
BY
ATTORNEY.

June 2, 1964 J. S. PILCH 3,135,404
TRACTOR MOUNTED COUNTERWEIGHT
Filed June 27, 1962 3 Sheets-Sheet 2

INVENTOR.
JOHN S. PILCH
BY
Raymond A. Paquin
ATTORNEY.

June 2, 1964 J. S. PILCH 3,135,404
TRACTOR MOUNTED COUNTERWEIGHT
Filed June 27, 1962 3 Sheets-Sheet 3

INVENTOR.
JOHN S. PILCH
BY
ATTORNEY.

3,135,404
TRACTOR MOUNTED COUNTERWEIGHT
John S. Pilch, % Ware Machine Works, Inc.,
P.O. Box 140, Ware, Mass.
Filed June 27, 1962, Ser. No. 205,764
7 Claims. (Cl. 214—142)

This invention relates to tractors and tractor mounted counterweights for application with a tractor loader or the like and has particular reference to a new and improved means for attaching said counterweights to and detaching them from said tractor loader.

An object of the invention is to provide new and improved means for attaching counterweights to and detaching them from a tractor loader whereby the counterweights may be readily and speedily attached to and detached from the tractor loader.

Another object is to provide a new and improved means for attaching or detaching counterweights to a tractor loader whereby such attachment or detachment may be made by one man working alone without the use of apparatus such as hoists or cranes additional to the tractor loader being fitted with the counterweights.

Another object is to provide a new and improved means for attaching counterweights to a tractor loader whereby the power of the tractor loader may be utilized in assisting in such attachment.

Another object is to provide a new and improved means for attaching counterweights to a tractor loader whereby such attachment may be speedily performed by the operator of such loader alone with only the assistance of the power of the tractor loader.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims, as the preferred form has been given by way of illustration only.

Referring to the drawings.

Figure 1:
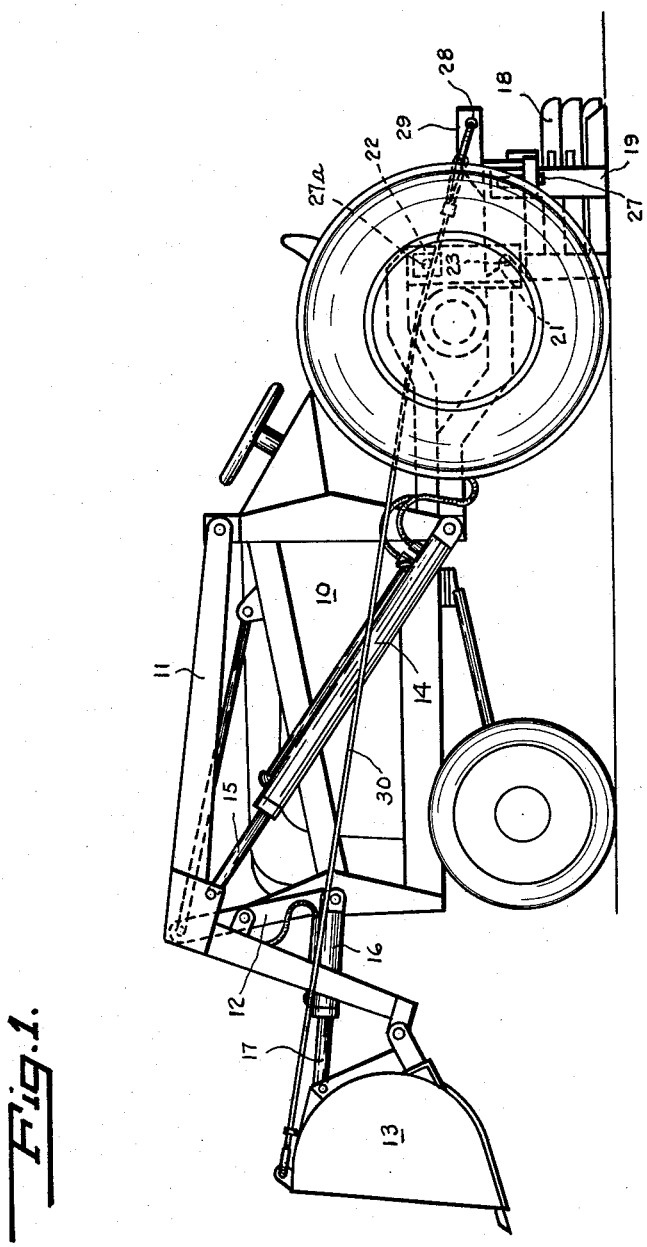
FIG. 1 is a side view of a device embodying the invention with the counterweights in position preparatory to being loaded.
Figure 2:
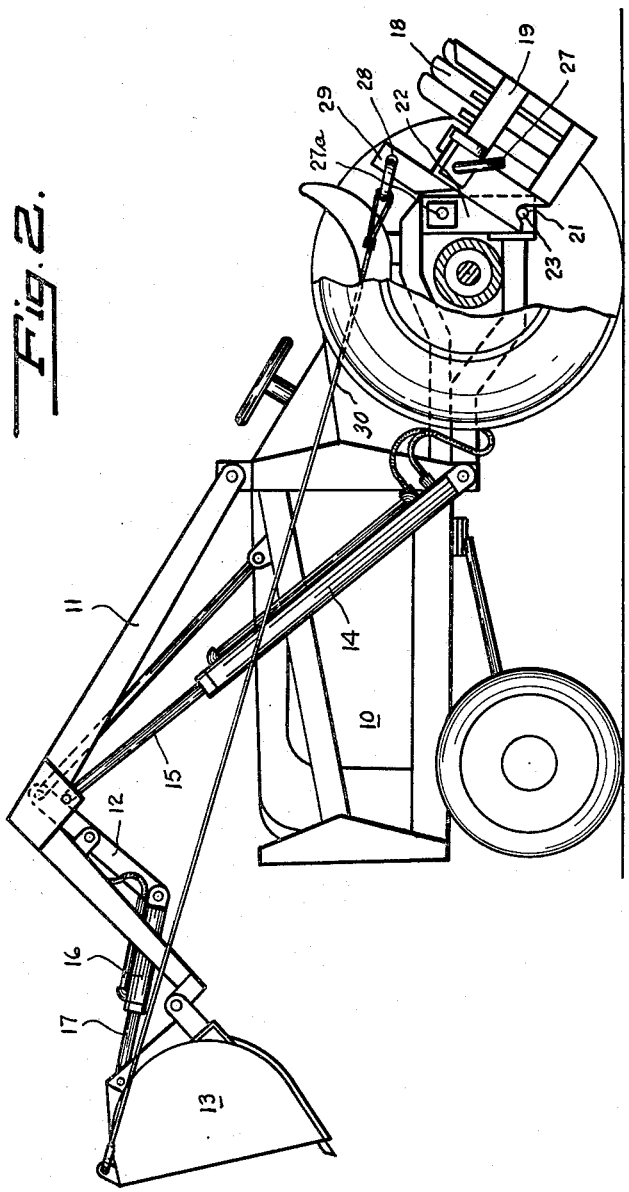
FIG. 2 is a side view of the device embodying the invention shown in FIG. 1 with the counterweights in a partially loaded position.
Figure 3:
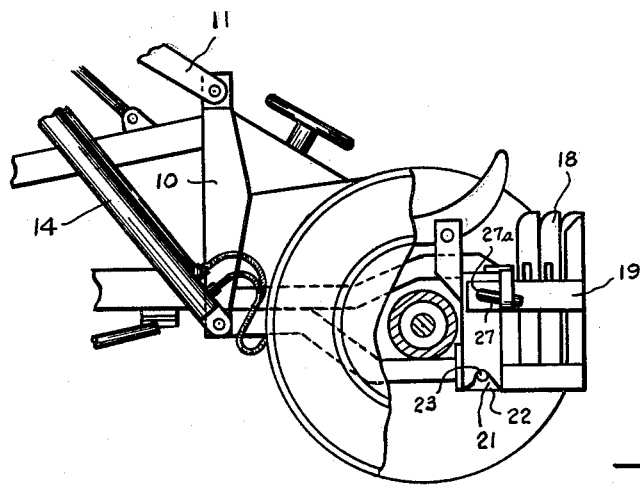
FIG. 3 is a fragmentary view of the tractor mounted loader and counterweight device embodying the invention showing the counterweighs in ttheir loaded operative position.
Figure 4:
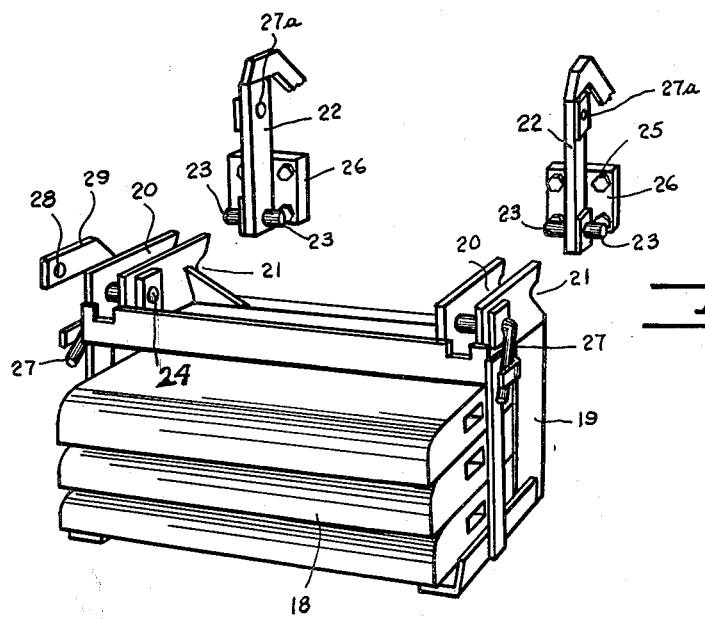
FIG. 4 is a perspective view of the counterweights and the attaching means.

Referring more particularly to the drawings wherein similar reference characters designate corresponding parts throughout the several views, the device shown embodying the invention comprises a tractor 10 having mounted thereon a loader including the loader or push arms 11, linkage 12, bucket 13 and the loader raising and lowering cylinder and ram 14 and 15, respectively. The bucket pivoting mechanism comprises the cylinder 16 and the ram 17 with cylinder 16 connected to linkage 12.

The weights consist of the counterweights 18 supported in the counterweight frame 19 for mounting upon the rear of the tractor 10.

The invention consists of a means for the easy attachment and detachment of these counterweights 18 upon the rear of said tractor 10 through the assistance of either the push arms 11 or the bucket 13 of the loader by one man alone.

Towards this end, members 20 containing pivot grooves or slots 21 are provided at the upper side of the counterweight frame 19 when the counterweight frame is on the ground, said grooves being so positioned as to receive and pivot upon the pivot pins 23 which pivot pins are mounted upon the rear of the tractor 10.

These pivot pins 23 are mounted upon the supports 22 on the rear of said tractor, which supports 22 are connected to plate 26 which is secured by bolts 25 to the rear of the tractor frame. Adjacent to the upper ends of said supports 22 are adapted to be placed locking bolts 27 through holes 27a and holes 24 in counterweight frame 19 to hold the counterweights 18 in their operative position upon the rear of the tractor in a manner that will be later described.

The pivot pins 23 are so positioned in said supports and said supports are of such a length that the height of the pins from the ground is the same as that of the slots 21 when the counterweight frame and counterweights are in their normal unloaded position as is shown in FIG. 1 and both the tractor and counterweight frame are together and on level ground.

This positioning of the slots 21 and the pivot pins 23 permits the operator of the tractor to back up the tractor such that said pivot pins slide into said slots without the use of additional machinery or the exertion of force supplemental to that provided by the backing up of the tractor.

The hole means 28 is, further, provided in the protruding arm 29 of the counterweight frame 19 adjacent to one of the plates 20 in such frame. This hole means 28 serves to receive a cable or similar connection means 30, which cable connects the counterweight frame 19 to either the bucket 13 or the loader arms 11 of the loader such that, either the movement of said loader arm or the rotation of said bucket, depending upon which the cable is connected to, will pull the counterweight frame 19 containing the counterweights 18 into operaitve position upon the rear of the tractor after the tractor has been backed up such that the slots 21 in the counterweight frame 19 engage the pivot pins 23 upon the rear of the tractor through the exertion by such movement of such a pulling force upon the counterweight frame that said counterweight frame pivots upon said pivot pins.

The hole means 24 serves in combination with locking bolt 27 located on one of the supports 22 to secure the counterweights 18 upon the rear of the tractor after their loading to such location such that operation of the tractor will not dislodge them from such position.

In operation, when the operator of the tractor loader wishes to load the counterweights 18 into operative position upon the tractor 10, he first backs the tractor up such that the pins 23 on the rear of the tractor engage the slots 21 in the counterweight frame 19.

Then he attaches one end of the cable 30 to the hole means 28 in the counterweight frame 19 and the other end to either the bucket 13 or the loader arm 11 of the loader.

After such attachment, the operator merely operates the tractor 10 to either rotate the bucket 13 of the loader, if he has attached the cable to such bucket, or to move the loader arms 12, if he has attached the cable to said arm.

Through this simple mechanical operation, the counterweights 18 are pivoted upon the pivot pins 23 and the counterweights loaded upon the tractor in operative position as previously described.

The operator of the tractor, then, in order to lock the counterweights in such operative position merely places locking bolt 27 through both holes 27a in support 22 and hole means 24 in the counterweight frame 19 and detaches the cable 30 from its two connections.

This act performed, the counterweights are then locked securely in operative position and the tractor loader is ready for operation in its usual manner. Should the operator desire to unload the counterweights, he merely reverses this procedure.

From the foregoing it will be seen that I have provided an arrangement whereby counterweights may be easily and quickly attached to or detached from a tractor loader through the minimum effort of one man with the assistance of the tractor loader being fitted with the counterweights.

From the foregoing, it will be seen that I have provided new and improved means for obtaining all of the objects and advantages of the invention.

I claim:

1. In a detachable tractor mounted counterweight adapted to be detached from and attached to a tractor, a counterweight support adapted for supporting counterweight means on a tractor, said support having a pair of spaced pivot connecting portions adapted to be at a distance above the ground when the counterweight is detached from the tractor, the tractor having a pair of pivot connecting members at a distance above the ground and adapted to be moved into engagement with said counterweight support pivot connecting portions by movement of said tractor, and connecting means actuated by said tractor and when connected to said counterweight support to pivot said support into operative position on said tractor.

2. In a detachable tractor mounted counterweight adapted to be detached from and attached to a tractor, a counterweight support adapted for supporting counterweight means on a tractor, said support having a pair of spaced pivot connecting portions adapted to be at a distance above the ground when the counterweight is detached from the tractor, the tractor having a pair of pivot connecting members at a distance above the ground and adapted to be moved into engagement with said counterweight support pivot connecting portions by movement of said tractor, and connecting means actuated by said tractor and when connected to said counterweight support to pivot said support into operative position on said tractor and means for locking said counterweight support in said operative position.

3. In a detachable tractor mounted counterweight adapted to be detached from and attached to a tractor, a counterweight support adapted for supporting counterweight means on a tractor, said support having a pair of spaced pivot connecting portions adapted to be at a distance above the ground when the counterweight is detached from the tractor, the tractor having a pair of pivot connecting members at a distance above the ground and adapted to be moved into engagement with said counterweight support pivot connecting portions by movement of said tractor, and connecting means actuated by said tractor and when connected to said counterweight support to pivot said support into operative position on said tractor, said connecting means comprising a cable.

4. In a detachable tractor mounted counterweight adapted to be detached from and attached to a tractor, a counterweight support adapted for supporting counterweight means on a tractor, said support having a pair of spaced pivot connecting portions adapted to be at a distance above the ground when the counterweight is detached from the tractor, the tractor having a pair of pivot connecting members at a distance above the ground and adapted to be moved into engagement with said counterweight support pivot connecting portions by movement of said tractor, and connecting means actuated by said tractor and when connected to said counterweight support to pivot said support into operative position on said tractor and means for locking said counterweight support in said operative position, and connecting means comprising a cable.

5. In a detachable tractor mounted counterweight adapted to be detached from and attached to a tractor, a counterweight support adapted for supporting counterweight means on a tractor, said support having a pair of spaced pivot connecting portions adapted to be at a distance above the ground when the counterweight is detached from the tractor, the tractor having a pair of pivot connecting members at a distance above the ground and adapted to be moved into engagement with said counterweight support pivot connecting portions by movement of said tractor, and connecting means actuated by said tractor and when connected to said counterweight support to pivot said support into operative position on said tractor and locking pin means for locking said counterweight support in said operative position.

6. In a detachable tractor mounted counterweight adapted to be detached from and attached to a tractor, a counterweight support adapted for supporting counterweight means on a tractor, said support having a pair of spaced pivot connecting portions adapted to be at a distance above the ground when the counterweight is detached from the tractor, the tractor having a pair of pivot connecting members at a distance above the ground and adapted to be moved into engagement with said counterweight support pivot connecting portions by movement of said tractor, and connecting means actuated by said tractor and when connected to said counterweight support to pivot said support into operative position on said tractor and locking pin means for locking said counterweight support in said operative position, said connecting means comprising a cable.

7. In a detachable tractor mounted counterweight adapted to be detached from and attached to a tractor, a counterweight support adapted for supporting counterweight means on a tractor, said support having a pair of spaced pivot connecting portions adapted to be at a distance above the ground when the counterweight is detached from the tractor, the tractor having a pair of pivot connecting members at a distance above the ground and adapted to be moved into engagement with said counterweight support pivot connecting portions by movement of said tractor, and connecting means actuated by said tractor and when connected to said counterweight support adjacent the end opposite said pivot means to pivot said support into operative position on said tractor and locking pin means for locking said counterweight support in said operative position.

References Cited in the file of this patent

UNITED STATES PATENTS

| | | |
|---|---|---|
| 2,722,320 | Dobens et al. | Nov. 1, 1955 |
| 2,820,556 | Davis | Jan. 21, 1958 |
| 2,967,718 | Orwig | Jan. 10, 1961 |

FOREIGN PATENTS

| | | |
|---|---|---|
| 1,773 | Great Britain | of 1862 |